Aug. 11, 1964   R. T. NAKASONE   3,143,883
VIBRATION DAMPING MEANS FOR TRANSDUCERS
Filed July 5, 1960   5 Sheets-Sheet 1

ROBERT T. NAKASONE
INVENTOR.

BY *(signature)*
ATTORNEY

ROBERT T. NAKASONE
INVENTOR.

BY
ATTORNEY

ROBERT T. NAKASONE
INVENTOR.

BY
ATTORNEY

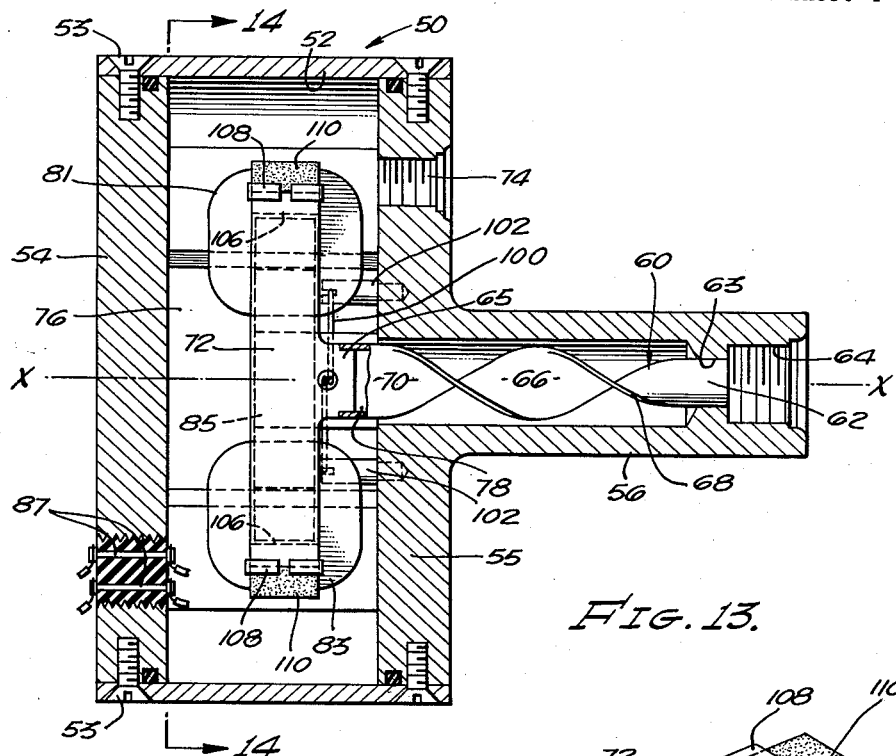
FIG. 13.
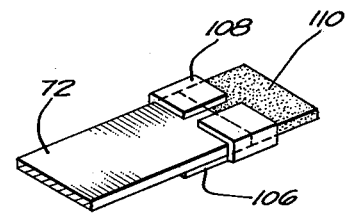
FIG. 15.
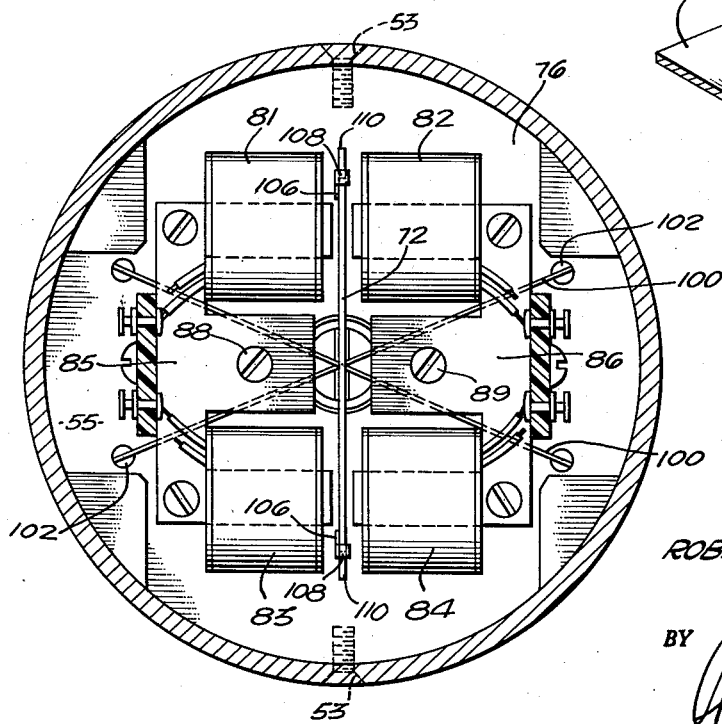
FIG. 14.
ROBERT T. NAKASONE
INVENTOR.
ATTORNEY

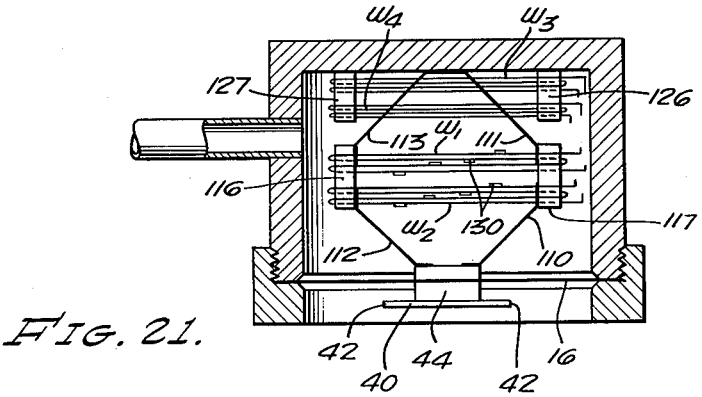
FIG. 21.
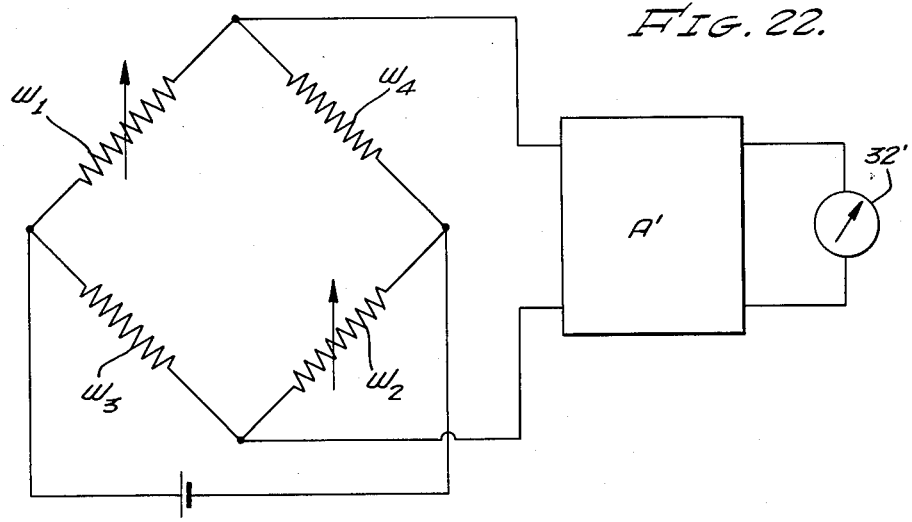
FIG. 22.
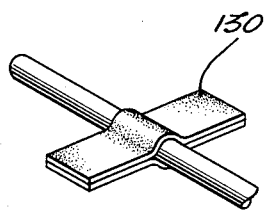
FIG. 24.
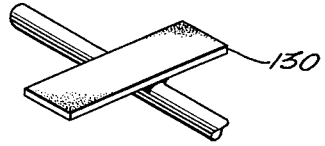
FIG. 23.
ROBERT T. NAKASONE
INVENTOR.
BY 
ATTORNEY

United States Patent Office 3,143,883
Patented Aug. 11, 1964

3,143,883
VIBRATION DAMPING MEANS FOR
TRANSDUCERS
Robert T. Nakasone, Tujunga, Calif., assignor, by mesne assignments, to Tamar Electronics, Inc., a corporation of California
Filed July 5, 1960, Ser. No. 40,730
9 Claims. (Cl. 73—414)

This invention relates to improvements in transducers and particularly to an improved arrangement for damping vibrations of the moving elements of a transducer. More particularly, this invention makes use of the molecular friction, or anelastic, properties of a solid damping element of cantilever configuration, without introducing the heretofore inevitable hysteresis effects on the vibrating system being damped.

In general, all methods of damping vibrating systems utilize elements which absorb energy. Whether the system be electrical, mechanical, acoustic, etc., energy dissipation elements are involved whenever effective damping of the system over a wide frequency spectrum is desired. The following classification serves to distinguish methods of vibration damping in terms of the dissipation mechanism employed:

(1) Viscous damping:
   Damping force proportional to velocity of vibration.
(2) Molecular friction damping:
   Damping force proportional to amplitude of vibration.
(3) Coulomb damping:
   Damping force equals a constant.

In the present state of the art, viscous damping has been the only mechanism employed to damp vibrating systems without introducing hysteresis effects on the system. As is well known, this method utilizes the viscosity of liquid and gases in damping mechanical systems. In damping such systems, energy is dissipated when adjacent layers of fluid are sheared, thus producing a velocity gradient across these layers. The velocity referred to is measured in the direction of the layers, while the gradient is perpendicular to them.

Coulomb damping is produced by relative sliding between two surfaces of solid materials. This is probably the best known form of energy dissipation, and the manifestation is commonly associated with "heat of friction." Coulomb damping is not suitable for use in transducers of high accuracy, but when it is used, the error is sometimes termed "stiction."

Molecular friction damping utilizes the energy dissipation properties within a solid when the material is stressed. In this connection, it is to be noted that the distinguishing feature between fluids and solids is that the fluids do not support shear stresses, while solids do; e.g., fluid is said to possess viscosity, while a solid does not. The energy loss due to molecular friction is analogous to hysteresis loss in magnetic materials as depicted by the area enclosed in a complete cycle of the B-H curve. This form of damping is well known in the form of rubber shockmounts used in supporting an automobile engine on its chassis. All conventional physical embodiments of molecular friction damping are unacceptable in damping transducers for high accuracy applications. The reason for this will become apparent in the following transducer discussion. This invention therefore relates to a novel physical embodiment of molecular friction damping and is especially useful in high accuracy measurement devices in which the conventional viscous damping mechanism becomes impractical for the following reasons:

(1) High natural frequency of the vibrating system to be damped.
(2) Size, weight and cost of the required viscous damping system.

Broadly speaking, an electromechanical transducer is a device which measures physical variables such as pressure, acceleration, flow, etc., by converting the physical variable to a corresponding electrical signal as shown in the functional block diagram of FIGURE 1, which shows a sensing element and a transducing element of an electromechanical transducer. In such a transducer, two conversion processes are involved:

(1) The sensing element converts the physical variable into a mechanical displacement.
(2) The transducing element converts the mechanical displacement to a corresponding electrical output signal, e.g., voltage or current of steady state (D.C.) or non-steady state (alternating current or pulses).

Typical sensing elements include bellows, Bourdon tubes, diaphragms, cylinders, and rings. Typical transducing elements include strain gages, variable reluctance elements, potentiometers, and differential transformers.

In the majority of applications, it is desirable to maintain a linear relationship between the physical variable input and the electrical signal output. In all applications it is desirable to maintain a single-valued relationship between the physical variable input and the electrical signal output, e.g., for any fixed value of input there should be a unique value of output regardless of whether the fixed value of input was attained from a previously higher-value or lower-value condition. Lack of conformance to this relationship is known in the art as hysteresis. In high accuracy applications, hysteresis generally represents the limiting threshold of accuracy attainable and is sometimes called "mechanical noise level."

It is obvious that any measurement which depends on past history of the physical variable has an ambiguity which would be extremely difficult to eliminate by means of instrumentation. Generally speaking, hysteresis is predominately of mechanical origin, e.g., in the sensing element. In a well-designed instrument, hysteresis may be as low as .01% when expressed as a percentage of the full scale value of either input or output function. In other words, the maximum deviation from a single value may be as low as one part in ten thousand of the full scale value. In all applications, a transducer designed to measure a particular physical variable should not measure other physical variables. For example, a pressure transducer should not act as an accelerometer, vibrometer, thermometer, or the like. Indeed a figure of merit in transducer design is quantitatively expressed in terms of the degree of immunity to measuring physical variables other than the desired quantity. In general then, a transducer should exhibit minimum non-linearity, minimum hysteresis, and maximum immunity to measuring any or all physical variable other than the desired variables.

The broad aspects of this invention will understood by reference to FIGS. 2, 3 and 4, where various symbols have the following meanings:

$I$=physical variable input such as pressure.
$K$=spring constant of the sensing element.
$M_1$=effective mass of the sensing element.
$M_2$=effective mass of damping element as viewed at its end remote from the sensing element.
$B$=effective damping coefficient of damping element, as defined later.
$y_1$=displacement of sensing element.
$y_2$=displacement of outer end of damping element.
$A_0$=magnitude of applied acceleration.

FIG. 2 is a mechanical diagram of a typical damped pressure sensing element. It is apparent from this figure that the damping device is connected with one end attached to the mass $M_1$ and the other end grounded. In short, it appears across the spring. By intent, the spring element is normally designed to be highly linear and is always designed to have very little, or minimum, hysteresis. It can readily be seen that any damping element made of solid material exhibiting friction, whether of the molecular or coulomb type, adds hysteresis to the system and directly degrades the accuracy of the deflection reading. In other words, if damping is introduced by an element that is connected between the moving end of the sensing element and the case, the displacement $y_1$ of the mass corresponding to the application of a particular physical variable input, such as a particular pressure, depends upon the prior history of the sensing element. For example, the value of the displacement $y_1$ corresponding to a particular current pressure applied would depend upon whether the recent prior pressure was higher or lower than the current pressure.

FIG. 3 is a mechanical diagram of a pressure sensing element utilizing the novel method of damping of this invention. It is apparent from this figure that the damping device is not connected across the spring. Indeed, one end of the damping device is attached to the sensing element having mass $M_1$ and the other end is attached to a floating mass $M_2$. With this system, friction within the element B does not add hysteresis to the system. In short, this invention resides in the use of a solid damping element that has one end connected to the sensing element and the other end free, that is, disconnected from the case or the mechanical ground. In such an arrangement, the free end is in effect physically ungrounded. Such an ungrounded free end acts as a "virtual ground." The degree to which the free end approaches such a "virtual ground" increases with the effective mass of damping element as viewed at that free end. To approach such a "virtual ground" more closely in some forms of the invention, a mass or inertial member is secured to a point adjacent the free end of the damping element.

Though this invention finds its primary use in highly attenuating the effects of vibration on pressure transducers and other devices that are intended to measure pressure or other physical variables other than vibration, the invention may also even be used with accelerometers and vibrometers. In the latter case, the vibration dampers of this invention may be employed to eliminate vibrations in modes different from the vibrations of the type that are to be detected.

In any event, in accordance with this invention, a vibration damper is employed which comprises a cantilever damping element composed of solid material having high molecular friction characteristics and rigidly attached to one part of a sensing or other element subjected to vibration and extending outwardly from the sensing element in cantilever beam fashion. In other words, in accordance with this invention, one part of the vibration damper is physically attached to the sensing element at all times and is thereby forced to follow displacements of the sensing element identically while another part of the vibration damper is free of connection to the sensing element except through the vibration damping element itself. The part of the vibration damper connected to the sensing element is forced to follow the displacement of the sensing element identically while all other parts of the damper do not follow that displacement identically. It is to be borne in mind that the term "displacement" is used broadly herein to refer to either linear displacement or angular displacement, depending upon the type of sensing system employed. Usually, the vibration damper of this invention comprises a tab composed of a material of high molecular friction and the tab extends outwardly from the sensing element.

With this invention, whenever the sensing element vibrates in response to external vibrating forces, the tab bends or flexes as though its outer end were grounded. The internal energy loss (molecular friction) created within the material by virtue of this bending or flexing action absorbs the energy of vibration and thereby damps or substantially reduces the amplitude of vibration of the sensing element. FIG. 5 represents how this internal energy loss or molecular friction energy is defined in terms of the area enclosed by the stress versus strain curve of a suitable material. This curve is illustrative of any type of loading condition, e.g., tension and compression, bending, torsion, etc. In the case of pure tension and compression loading, all elemental volumes within the material simultaneously undergo the same values of stress and strain. In the case of bending or torsion loading, some average value of all elemental volumes must be assigned to the stress and strain scales. However, in all cases, the area enclosed by the applicable stress-strain curve defines the energy absorbed by the material per cycle.

Referring to FIG. 4 and the equivalent mechanical and electrical networks shown in FIGS. 6 and 7, some intuitive feeling for design criteria to optimize vibration resistance characteristics is possible. FIG. 4 is a mechanical diagram of a pressure transducer damped by means of this invention and excited in vibration as a seismic system, e.g., causing the case to accelerate with an acceleration of magnitude $A_0$. The molecular friction property of the vibration damping tab is represented by an element having an equivalent force per unit velocity B. Such an element is analogous to a resistance element in the electrical circuit. The spring of the mechanical system is equivalent to an inductance in the electrical circuit, while the masses of the mechanical system are equivalent to capacitors in the electrical equivalent. In addition, the force in the mechanical system is equivalent to current in the electrical equivalent and displacements of the masses are equivalent to voltages. It is to be noted that in setting up the electrical equivalent, the effect of the spring characteristic of the damping element as represented by the compliance $K_T$ has been omitted. In other words, it has been assumed that for the purpose of mathematical analysis over the range of frequencies of concern here, the tab acts purely as a damping element, not as a compliant element. From an examination of FIG. 4, the effect of the various values of the damping factor B can be ascertained broadly. More particularly (1) For $B=0$, no force is transmitted through the damping element. In other words, the mass $M_2$ is completely decoupled from the sensing element $M_1$ and K and the system resonates at the natural frequency $\omega_0$ of the sensing element. In this case, the displacement $Y_1$ approaches infinity and the natural frequency is given by the equation $$\omega_0 = \left(\frac{K}{M_1}\right)^{1/2}$$

(2) For $B=\infty$, all the force is transmitted through the damping element. In other words, the mass $M_2$ is in effect rigidly coupled to the sensing element and the system resonates at some lower natural frequency $\omega_0'$.

In this case, too, the displacement $Y_1$ approaches infinity, but the natural frequency is given by the equation $$\omega_0' = \left(\frac{K}{M_{1+2}}\right)^{1/2}$$

(3) Somewhere between the extremes of zero and infinity, an optimum value of B exists where maximum damping effect on the sensing element system is realized and a minimum displacement of $Y_1$ is realized.

A curve depicting this relationship between B and energy loss W realizable is shown in FIG. 8.

It will subsequently be shown that the optimum value for B for a minimum peak value of sensing element displacement $Y_1$ is a function of the ratio of masses $$(M_2/M_1).$$

It is to be noted that the symbol $Y_x$ is employed to designate the peak amplitude of a sinusoidal component of a particular frequency $\omega$ having an instantaneous magnitude that varies as a function of time in accordance with the formula $y_x = y_x \sin \omega t$.

In the preceding description, it has been tacitly assumed that the damping force can be expressed as an equivalent viscous damping force, e.g., force proportional to velocity.

(1.1) $\quad F_m = B\frac{d}{dt}(y_1 - y_2)$ where
$F_m$ = molecular friction force
$B$ = equivalent viscous mechanical resistance This may appear to be a rather tenuous assumption when examining the mechanism of molecular friction as depicted in FIG. 5 where:

(1.2) $\quad W_m$ = area within hysteresis loop
= energy dissipated/cycle/unit volume.

Assuming an elliptical shaped loop for the sake of computation (1.21) $\quad W_m = \pi \sigma_m \xi_m = E\xi_m^2$ where: $E = $ Young's modulus $= \frac{\sigma_m}{\xi_m}$ Since energy dissipation by molecular friction is proportional to square of maximum strain ($\xi_m^2$), the damping force must be proportional to maximum strain ($\xi_m$) e.g., (1.3) $\quad F_m = \left(\frac{\partial W_m}{\partial \xi_m}\right) = 2E\xi_m$ Experimental results by several investigators in this field have verified that molecular friction is independent of frequency if the amplitude of strain is above some small threshold value. However, it has been shown by these investigators that the damping force may be represented by a term of the form $$b\left(\frac{dy}{dt}\right)$$

thus simulating a force that is proportional to velocity. In more general terms, any type of vibration damping in which the energy loss per cycle is proportional to the square of the amplitude of vibration can be accurately expressed as:

$$F = B\left(\frac{dy}{dt}\right)$$

It has been shown that the molecular friction damping resistance for the case of a linear second-order single degree of freedom system where the dissipation per cycle is independent of frequency is:

(1.4) $\quad b = \frac{\xi EK}{\pi \omega_a}$ where:

$K$ = spring constant of cantilever
$b$ = molecular friction within the cantilever material
$E$ = Young's molecular for spring material
$\xi$ = strain within material
$\omega_a$ = natural frequency with a lumped mass added at end of cantilever In the preceding description, network analysis was applied to a system that is obviously distributed. While the field of electrical circuit engineering is founded on the application of such an equivalence, the degree to which a lump resistor behaves as an inductor, or capacitor, etc., must be assessed before a given accuracy in results can be evaluated. Therefore, cetrain clarification on the lumped constant assumptions made is in order.

(1) The sensing element of FIG. 2 is made of material having low anelastic properties. In this way, deflection accuracy dependence on past cyclic history is minimized. Therefore, by comparison with material $M_2$, the molecular damping in material $M_1$ and K is negligible. In other words, the damping material exhibits a high degree of hysteresis, while the material of the sensing element exhibits a low degree of hysteresis.

(2) The high molecular friction material $M_2$ has a spring constant, but since this spring is effectively in parallel with a high damping resistance, the spring constant effect is small by comparison.

(3) In the damping optimization analysis to follow, B will be assumed to be equivalent to a viscous damping resistance. While the final result based on this assumption is not strictly correct for the case of molecular damping, this approach can be justified on the following basis:

a. The final results are applicable to molecular damping within engineering accuracies required in a majority of designs.
b. The tools for optimization are directly applicable and become available to the designer with less mathematical complication.
r. For all practical purposes, it demonstrates the "how and why" of the invention.

The preceding presentation has been a qualitative discusion of this invention from a layman's viewpoint. From an engineering designer's viewpoint, a more rigorous quantitative discussion is in order. The following analysis is therefore submitted to provide tools helpful to the designer. This analysis will assist the designer to achieve (1) An understanding of the parametric relationships existing between transducer elements and molecular friction damping elements to guide design.

(2) An understanding of the design optimization relationships for establishing minimum vibration response in a transducer in terms of quantitative definitions of the following:

a. The optimum amplitude of vibration, e.g., minimum peak vibrating amplitude of the sensing element over a frequency spectrum. ($Y_{opt.}$)
b. The optimum damping ratio, e.g., the value of damping ratio which establishes optimum amplitude of vibration. ($h_{opt.}$)
c. The optimum frequency ratio, e.g., the frequency at which optimum amplitude of vibration occurs. ($\beta_{opt.}$)

Referring back to FIG. 4 and the corresponding network diagrams of FIG. 6, the analysis follows:
Applying a force summation at node 1 shows:

(2.0) $\quad (M_1s^2 + Bs + K)Y_1(s) - BsY_2(s) = F(s)$ where:
$s$ = complex variable of Laplace transform
$= \theta + j\omega$ $F(s)$ = applied vibrating force due to acceleration $A_0$
$$= \frac{KA_0(s)}{s^2} = KY_0$$

Applying a force summation at node 2 shows:

(2.1) $\quad -BsY_1(s) + (M_2 s^2 + B)Y_2(s) = 0$

Rearranging Eq. 2.1 yields:

(2.11) $\quad Y_2(s) = \left(\frac{B}{M_2 s + B}\right) Y_1(s)$

Substituting Eq. 2.11 into Eq. 2.0 yields:

(2.2)
$$Y_1(s) = \frac{(s + B/M_2) F}{M_1 \left[ s^3 + \left(\frac{B}{M_1} + \frac{B}{M_2}\right) s^2 + \left(\frac{K}{M_1}\right) s + \frac{KB}{M_1 M_2}\right]}$$

Since we are interested in the frequency domain, let $s = j\omega$ and dividing numerator and denominator of Eq. 2.2 by the undamped natural frequency of the transducer $$\omega_0 = \left(\frac{K}{M_1}\right)^{1/2}$$

yields (2.3)
$$Y_1(j\omega) = \frac{\frac{B}{M_2 \omega_0} + j\left(\frac{\omega}{\omega_0}\right)}{\frac{1}{\omega_0^3}\left[ j(-\omega^3 + \omega \omega_0^2) - \omega^2\left(\frac{B}{M_1} + \frac{B}{M_2}\right) + \omega_0^2 \frac{B}{M_2}\right]}\left(\frac{F}{K}\right)$$

Eq. 2.3 may be normalized with the following substitutions.

(2.31) $\quad \beta = \frac{\omega}{\omega_0}$
$\quad\quad$ = ratio of driving frequency to natural frequency (2.32) $\quad h = \frac{B}{2 M_2 \omega_0} = \frac{B}{2(KM_2)^{1/2}} \left(\frac{M_1}{M_2}\right)^{1/2}$
$\quad\quad$ = percentage of "critical damping"

(2.33) $\quad h\left(\frac{M_2}{M_1}\right) = \frac{B}{2 M_1 \omega_0}$ (2.34)
$Y_0 = \frac{F}{K}$ = static deflection in response to a static force $F$ Substituting the Relations 2.31 through 2.34 into Eq. 2.3 yields (2.35) $\quad \dfrac{Y_1(\beta)}{Y_0} = \dfrac{2h + j\beta}{-2h\beta^2 \left(\dfrac{M_2}{M_1} + 1\right) + 2h - j\beta(\beta^2 - 1)}$ The absolute value of
$$\frac{Y_1(\beta)}{Y_0}$$
is given by:

(2.4)
$$\left|\frac{Y_1(\beta)}{Y_0}\right| = \left[\frac{4h^2 + \beta^2}{\beta^2(\beta^2 - 1)^2 + 4h^2\left(\beta^2 + \frac{M_2}{M_1}\beta^2 - 1\right)^2}\right]^{1/2}$$

Equation 2.4 is the basic frequency response equation from which design optimization criteria can be established. Since $\omega = \beta \omega_0$, this equation expresses the deflection $Y_1$ of the sensing element spring as a function of vibration frequency $\omega$. More exactly, it expresses the ratio of the vibrating to static deflection as a function of the ratio of the driving frequency to the undamped natural frequency of the system. From Eq. 2.4, the following design optimizing equations can be derived:

(2.5) $\quad \left(\dfrac{Y_1}{Y_0}\right)_{\text{opt.}} = 1 + \dfrac{2}{\left(\dfrac{M_2}{M_1}\right)}$ (2.6) $\quad \beta_{\text{opt.}} = \left[\dfrac{2}{2 + \dfrac{M_2}{M_1}}\right]^{1/2}$ (2.7) $\quad h_{\text{opt.}} = \left[\dfrac{1}{2\left(2 + \dfrac{M_2}{M_1}\right)\left(1 + \dfrac{M_2}{M_1}\right)}\right]^{1/2}$ The manner in which the peak amplitude varies with frequency for different values of $h$ in a typical case is shown in FIG. 9. Here it will be noted that plots of Equation 2.4 have been given for three specific values of $h$. In two cases, namely those for which $h = 0$ and $h = \infty$, the value of the amplitude ratio $Y_1/Y_0$ approaches infinity. But for a particular intermediate value of $h$ corresponding to optimum conditions, the maximum value of the amplitude ratio $Y_1/Y_0$ is less than about 3.

Equations 2.5 through 2.7 define the necessary tools for the designer by quantitatively establishing:

(1) The minimum peak amplitude of the sensing element over the frequency spectrum.
(2) The frequency at which this minimum peak amplitude is realized.
(3) The damping ratio necessary to realize this minimum peak amplitude.

It should be noted that all of the above relationships are uniquely defined by the ratio of damping element mass to sensing element mass $(M_2/M_1)$. Results of this analysis shows, for example, that:

(1) For minimum vibration response, the ratio of $(M_2/M_1)$ should be as large as possible. If $M_1 = M_2$, the peak amplitude will equal three times the static amplitude response.
(2) This value of peak amplitude occurs at $\beta = .81$ or at 81% of the undamped natural frequency.
(3) This value of peak amplitude is realizable at
$h = 0.29$ or the value of damping coefficient B is $B = .58(KM_2)^{1/2}$.

A design chart plotting these optimizing parameters as a function of $(M_2/M_1)$ is shown in FIG. 10. In this figure, graph $G_1$ is a plot of the ratio of the optimum value of the amplitude ratio $Y_1/Y_0$ as a function of the mass ratio $M_2/M_1$. Graph $G_2$ represents the value of the damping factor $h$ that is required to produce the optimum ratio $Y_1/Y_0$ at a given mass ratio $M_2/M_1$. Similarly, graph $G_3$ represents the value of the frequency ratio $\beta$ that is required to produce the optimum ratio $Y_1/Y_0$ at a given mass ratio $M_2/M_1$.

Various objects, features and advantages of the invention will be apparent from the explanation set forth herein, taken in connection with the accompanying drawings in which:

FIG. 13 is a longitudinal cross-sectional view of another pressure transducer embodying this invention;

FIG. 14 is a cross-sectional view of the latter transducer taken on the plane 14—14 of FIG. 13;

FIG. 15 is a perspective view of the damping tabs of the transducer of FIGS. 13 and 14;

FIG. 21 is a schematic diagram of an alternative embodiment of the invention;

FIG. 22 is a wiring diagram of a measuring circuit employed with the electromechanical transducer of FIG. 21; and FIGS. 23 and 24 are perspective fragmentary views of damping tabs employed on the transducing elements of the transducer of FIG. 21.

Figure 1:
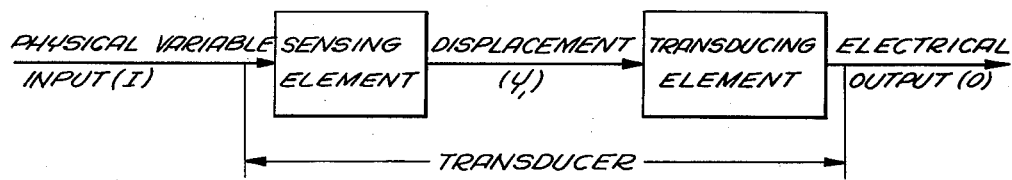
FIGURE 1 is a block diagram of a transducer.
Figure 2:
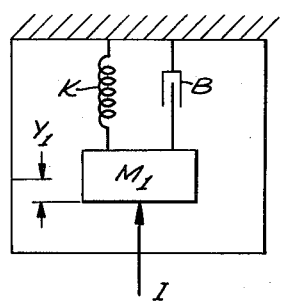
FIG. 2 is a schematic diagram of a transducer employing a conventional type of damping.
Figure 3:
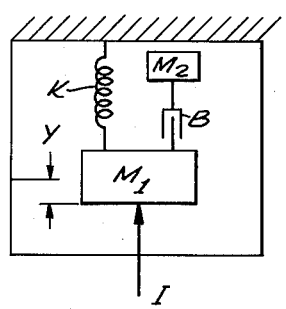
FIG. 3 is a schematic diagram of an electromechanical transducer employing this invention.
Figure 4:
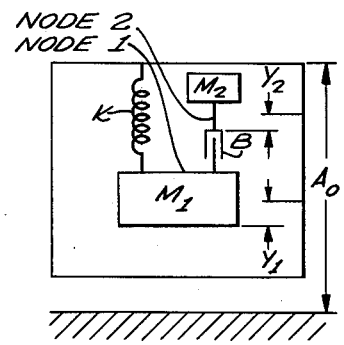
FIG. 4 is a schematic diagram of the same transducer used in the derivation of certain equations.
Figure 5:
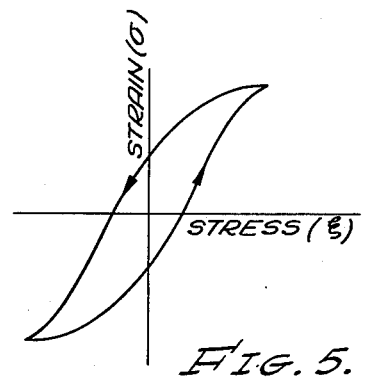
FIG. 5 is a graph showing a mechanical hysteresis loop.
Figure 7:
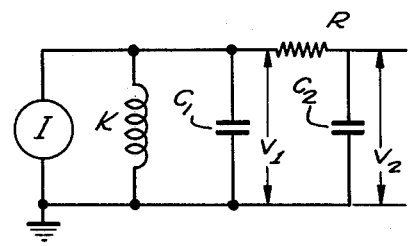
FIGS. 6 and 7 are mechanical and electrical equivalent circuits respectively, employed in explaining the invention.
Figure 6:
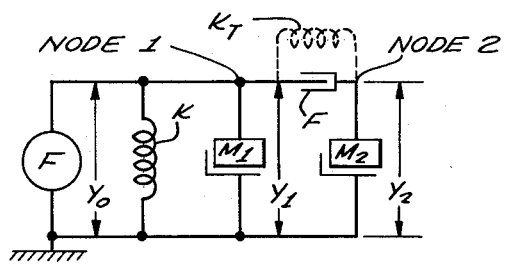
Figure 8:
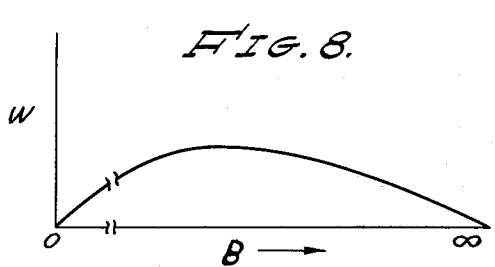
FIG. 8 is a graph employed to establish the plausibility that maximum damping can be attained.
Figure 9:
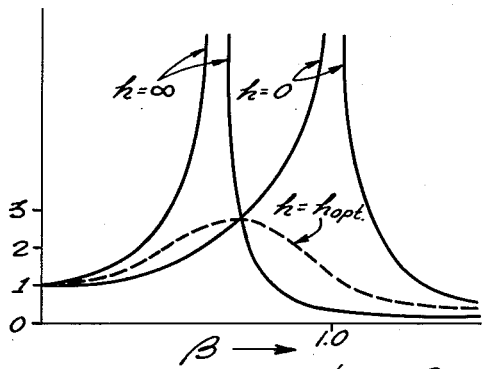
FIG. 9 is a graph showing the degree of resonance attainable in different damping conditions.

In the drawings there are illustrated several embodiments of the invention as applied to pressure transducers. In the transducer represented by FIGS. 11 and 12, damping elements in the form of tabs are employed in accordance with this invention to damp the translational vibration of a pressure-responsive diaphragm. In the transducer represented in FIGS. 13, 14, 15 and 17, damping tabs are employed in accordance with this invention primarily to damp rotational or angular vibrations of an armature that responds to changes in pressure. In the arrangement shown in FIGS. 13, 14 and 15, no mass is added to the tab; but in the modification represented by FIG. 17, inertia members are attached to the tabs to improve their action in damping vibrations.

Figure 11:
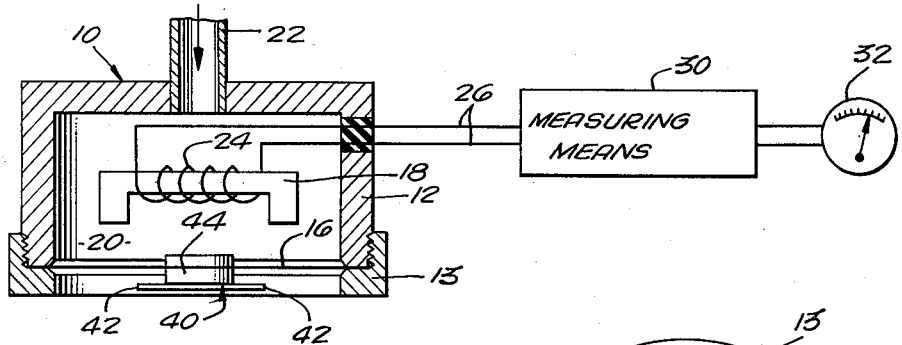
FIG. 11 is a schematic diagram of a simple pressure transducer employing the invention showing the transducer in cross section.
Figure 12:
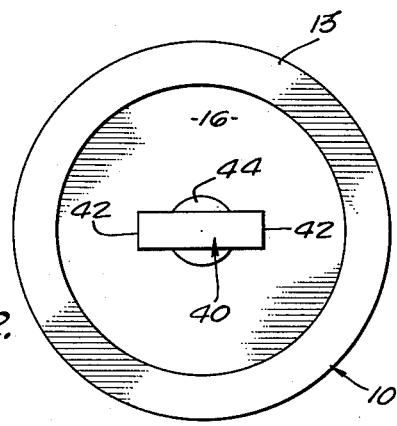
FIG. 12 is a bottom view of the foregoing transducer.

Referring first to FIGS. 11 and 12, there is illustrated a simple pressure transducer 10 that is represented very schematically in order to emphasize the principles that underlie this invention. This transducer includes a tubular housing 12 that has a diaphragm 16 held rigidly in place at one end by means of a clamping ring 13. For purposes of explanation, it is assumed that the outer side of the diaphragm is exposed to the atmosphere. The chamber 20 within the housing is sealed from the atmosphere, but has a pipe 22 connected to the wall thereof to provide for connecting the chamber 20 to a vessel or other source (not shown) containing gas or other fluid that is subject to changes in pressure. The diaphragm 16 is composed of soft iron. Associated with it is a U-shaped core 18 rigidly mounted in place in the housing 10 by suitable means, not shown. A coil 24 wound about the intermediate portion of the core 18 is connected by means of leads 26 to an external electrical circuit. In this transducer, the sensing element includes the diaphragm 16, and the transducing element includes the magnetic circuit comprising the core 18, as well as the diaphragm and the coil 24 that encircles the central portion of the core.

As is well known, the diaphragm 16 and the core 18 together constitute a variable reluctance device. When the differential pressure applied to the opposite sides of the diaphragm 16 changes, the diaphragm moves toward, or away, from the tips of the U-shaped core 18, as the case may be, thereby varying the effective impedance, that is, the effective reactance, of the coil 24. By means of methods which are well known, changes in the impedance of the variable reluctance unit can be measured. In one such system, the measuring means 30 includes a carrier wave signal, such as an alternating current oscillating at a frequency of 2000 c.p.s., which is applied to the leads 26. This current is modulated in amplitude in accordance with changes in impedance. Suitable means are provided in the measuring means 30 for applying to a meter 32 a current or voltage that indicates the changes in differential pressures that occur across the diaphragm 16. By suitable calibration, the meter connected to the output of the measuring means can be employed to indicate the difference in pressure directly on a scale 32. Since systems for producing a meter indication proportional to the change in position of a diaphragm 16 are well known, they will not be described herein in detail.

It is apparent that if the pressure of fluid in the chamber 20 is suddenly increased or decreased, the diaphragm 16 becomes shocked, or excited, thereby vibrating at its resonant frequency or frequencies. As a matter of fact, the diaphragm will vibrate at frequencies characteristic of several modes of vibration. Some of these frequencies depend upon the mass-per-unit area of the diaphragm, the dimensions of the diaphragm, the tension under which the diaphragm is stressed between the housing members 12 and 13, and on other factors.

In this embodiment of the invention, a solid strip of material is securely fastened to the diaphragm 16 at its center with the ends 42 forming tabs that are free of any connection to the diaphragm or to the housing except through the connection between the central part of the tab and a mounting element such as a stud 44 that projects from the center of the diaphragm. The tabs that extend from the stud at the ends of the strip are of cantilever configuration.

The tabs are composed of a material that is characterized by having high internal energy loss, and it has a low spring constant. Such loss results from the molecular friction or anelastic properties of the material. Materials which have been found to be suitable for this purpose include natural rubber, synthetic rubber, Mylar tape, and polyurethane resin. A material that has been found to be particularly suitable is a fluorocarbon type of silicon rubber known as Silastic LS–33, manufactured by the Dow-Corning Corporation of Midland, Michigan.

The center portion of the tab strip 40 is cemented to the flat surface of the stud 44, lying in a plane substantially parallel to the plane of the diaphragm 16. The dimensions of the tabs are such that the free ends thereof which extend beyond the edge of the stud 44 are self-sustaining so that they hold their shape, rather than flap around like thin sheets or threads. Thus, the tabs have bar or plate characteristics rather than sheet or filamentary characteristics. For this reason, when the end of a tab is displaced because of its inherent elasticity and resilience, it returns toward its previous position or shape when the displacing force is removed. The time, however, required for the tabs to return to their previous condition depends, in part, on the molecular friction of the material. By virtue of the fact that the tabs tend to return to their original position after being displaced, they are characterized by a compliance or spring "constant." In this invention, the spring constant of a tab is much less than the spring constant of the resilient element to which the tab is attached. Since compliance is the reciprocal of spring constant, the compliance of the tab is much higher than that of the armature. Due to the inertia of the tabs, even though the ends of the tabs are free of any direct connection to the diaphragm or to the housing, they tend to remain stationary while the portions of the tab that are cemented to the stud 44 move up and down with the diaphragm. Because the tabs are compliant, they bend, or flex, and the vibratory energy imparted to the tabs is absorbed rapidly because of the high internal energy loss characterisic of the tab material.

In FIGS. 13, 14, and 15, there is shown another type of pressure gauge 50 to which this invention has been applied. This pressure gauge is of the type described in Patent No. 2,788,665 that issued April 16, 1957, to Thomas H. Wiancko. This transducer comprises a pneumatically sealed housing or case 50 that comprises a cylindrical tubular member 52 secured by means of screws 53 to a cap plate 54 at one end and a base plate 55 at the other end. A hollow tubular stem or nose 56 extends outwardly along the axis of the base plate. A twist tube 60 is secured coaxially within the tubular member 56. The twist tube is hollow and is of circular cross-section at its outer end 62 where it is soldered, or otherwise firmly secured in sealing relationship with a reduced portion 63 of a threaded port 64. The outer end of the twist tube tapers inwardly to the main portion 66 that has an elongated rectangular transverse cross section. The main portion 66 is twisted about its central axis which lies on the axis X—X of the transducer so that its edges 68 form helices about that axis. The free inner end 70 of the twist-tube is closed by means of a tongue 65 of a soft iron vane or armature 72 that is soldered therein. The threaded port 64 provides a fitting for connection to a pipeline that leads to a vessel or other source of fluid having a pressure that is to be detected or measured. An auxiliary threaded port 74 is formed in the base plate 55 to establish communication with the chamber 76 within the housing.

The twist tube may be made responsive to the differential pressure between connections that are made to the two ports 64 and 74. However, if desired, the twist tube 60 may be evacuated and sealed by means of a plug (not shown) inserted into the port 64, thus rendering the twist tube responsive to the pressure of fluid that surrounds the twist tube, such as fluid that communicates with the chamber 76 through the fitting 74. With this arrangement, the free end 70 of the twist tube tends to rotate about the axis X—X by an amount that is substantially proportional to any difference in pressure that exists between fluid in the chamber 76 and fluid in the space 78 within the twist tube.

When such a differential pressure is applied, the twist tube 60 develops a torque that rotates the armature 72 by an amount that is substantially proportional to the applied differential pressure. In this specific embodiment of the invention, solid damping tabs extend radially from the outer ends of the armature 72 in order to damp rotational vibration of the armature that may be caused, either by the application of sudden changes of differential pressure or periodic changes in differential pressure or by the application of impacts or vibratory forces to the housing 50. In this connection, it is to be noted that if the housing is subjected to vibratory motion along the axis X—X, as by a test stand on which the transducer is mounted, such motion applies longitudinal forces to the twist tube 60. Such forces tend to cause the armature 72 to rotate about the axis X—X. Such spurious movement of the armature can produce an erroneous indication of the differential pressure if not eliminated, reduced or taken into account. In accordance with this invention, separate damping tabs 110, attached to the outer ends of the armature, are employed to reduce the amplitude of vibration of the armature that would otherwise be produced by vibration or shock applied to the housing, or by sudden changes in the differential fluid pressure being measured.

Figure 16:
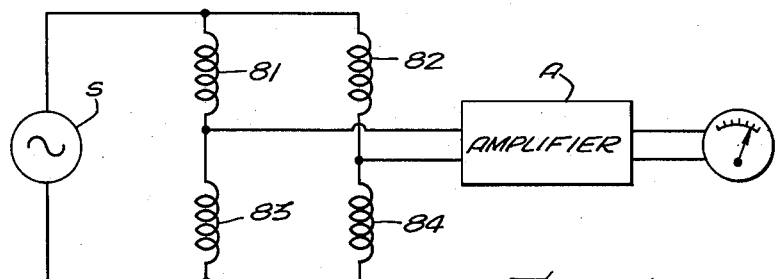
FIG. 16 is a schematic diagram of a circuit employed in measuring changes in pressure with a transducer of the type shown in FIGS. 13 and 14.

The movement of the armature 72 in response to differential pressure is detected by means of a variable reluctance magnetic circuit such as that represented in FIG. 16. This circuit includes four windings 81, 82, 83 and 84 that are linked with four magnetic circuits that pass through portions of the armature 72. The windings 81, 82, 83 and 84 are arranged on the outer legs of the two similar E-shaped magnetic cores 85 and 86, composed of soft iron and symmetrically arranged about the axis X—X, as shown in FIGS. 13 and 14. The E-shaped cores 85 and 86 are secured to the inner side of the base plate 55 by means of screws 88 and 89. The windings 81, 82, 83, and 84 are connected in the bridge circuit of FIG. 16 by four insulated leads 87 that extend through the end plate 54.

Any substantial lateral displacement of the armature 72 from the axis is minimized by means of a "frictionless bearing" provided in the form of a pair of tensioned crossing wires 100 which extend through and are secured to the inner end of the twist tube. The two wires are mounted under tension by attachment to spacers 102 attached to the base wall 55.

As shown in FIG. 16, the windings 81 and 83 are arranged in one branch of a bridge and the windings 82 and 84 are arranged in another branch of the bridge. A carrier wave signal supplied from a source S is applied to terminals of one diagonal of the bridge, and an amplifier A or other means is connected to terminals of the other diagonal of the bridge. With this arrangement, as the armature rotates, the inductances of the windings in any two adjacent arms of the bridge change in opposite directions, thereby changing the balance of the bridge and, hence, modulating the carrier wave appearing in the output by an amount that depends upon the angle of rotation of the armature from its neutral position. Such methods of measurement are well known and need not be any further described here. In some systems, the output of the amplifier is indicated on a meter. In other cases, as taught in Patent No. 2,788,655, the output of the amplifier is employed to apply a torque to the armature 72 in such a direction and amount as to oppose the movement of the armature otherwise caused by the differential pressure under investigation. In any event, any movement or vibration of the armature caused by the resonant characteristics of the system are greatly reduced or minimized in accordance with this invention.

As shown in FIGS. 13, 14 and 15, the damping tabs have the same cross-sectional area as the armature and extend outwardly from the ends thereof in the same plane as the armature. The mounting of the tabs on the armature is accomplished by means of a pair of clamps. Each clamp has a flat planar portion 106 which overlies an abutting end of the armature and the adjacent tab. Clamping legs 108 extending from the side of the clamp plates are bent over the abutting ends of the armature and tab to facilitate locking the tab securely in place. In addition, the clamp is bonded to the armature and to the tab by some suitable cement. Tabs which have been used successfully with an armature resiliently suspended by a helix to have a resonant frequency of 5000 c.p.s. have extended outwardly from the clamps by a distance of about ¼ inch and have had a thickness of about 25 mils and a width of about ⅕ of an inch, the same as the width of the armature.

Figure 17:
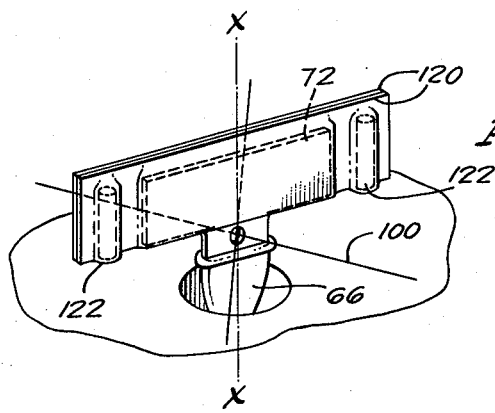
FIG. 17 is a perspective view of an alternative form of armature employed in the transducer of FIGS. 13 and 14.

In a modification of the tab structure of this invention, illustrated in FIG. 17, two strips 120 of highly anelastic material having larger areas than the armature are fastened together over the armature 72, and two inertia members in the form of rods 122 are secured in place between the outer ends of these two strips of material. In this case, it is to be noted that the strips of plastic material are slightly wider than the armature, but are longer than the armature so that portions of the strips extend outwardly beyond the ends of the armature, thereby providing tabs. The axes of the rod-shaped members are parallel to the axis X—X of rotation of the armature so as to permit maximum bending of the portions of the tabs that lie between these masses and the ends of the armature.

In a particular arrangement of tabs constructed as shown in FIG. 17, Mylar tape was employed. The tape was coated with adhesive materials on two facing sides. In assembly, the two strips of tape were pressed together, causing them to adhere to each other and to hold the armature and the inertia members firmly between them. It is to be noted that the width of the strips exceeded that of the armature so as to provide for direct adherence of the strips to each other along the edge of the armature, remote from the twist tube 66.

Figure 10:
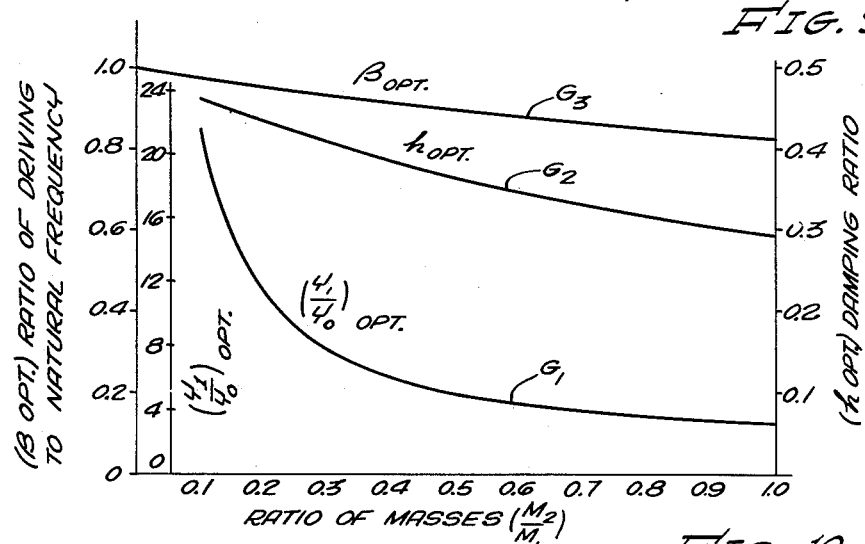
FIG. 10 is a series of graphs employed to explain how optimization of design is achieved.

With an arrangement such as shown in FIG. 17, greater flexing than would otherwise be obtained is produced in the portions of the tabs that lie between the ends of the armature and inertia masses 122. As a result of such increased flexing, a greater damping effect may be obtainable, as is evident from graph $G_1$ of FIG. 10.

Figure 18:
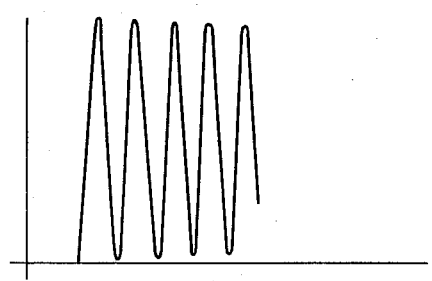
FIGS. 18, 19 and 20 represent oscillograms employed in explaining the damping effect of the tabs of this invention.
Figure 19:
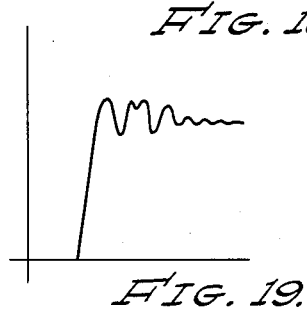
Figure 20:

The effectiveness of the damping system of this invention is illustrated by typical oscillograms shown in FIGS. 18, 19 and 20. In all three oscillograms, ordinates represent angular displacement of the armature about the axis X—X from its neutral position, while abscissae represent time. In each case, a sudden change in differential pressure has occurred at time $T_0$, changing from a differential pressure P1 to a differential pressure of P2. In all cases, it is noted that the pressure appears to oscillate about the value P2 immediately after the change occurred. This apparent oscillation of pressure is a spurious indication caused by the angular vibration of the armature about the axis X—X.

FIG. 18 is an oscillogram obtained with a pressure transducer of the type shown in FIGS. 13 and 14, but without any damping tabs in use. The oscillogram of FIG. 19 shows the response when plain tabs such as shown in FIG. 15 are employed. The oscillogram of FIG. 20 shows the response when damping tabs having inertia masses as shown in FIG. 17 are employed. It is clear from FIG. 18 that when the damping tabs are not employed, the shock to the system caused by a sudden change in differential pressure causes the armature to vibrate for a long time at its natural frequency. But, when the damping tabs of FIG. 15 are added, the vibration of the armature is attenuated very rapidly. And, when damping tabs of the type shown in FIG. 17, employing inertia members, are added, the vibration of the armature is attenuated even more rapidly.

It will be appreciated, of course, that even when damping tabs have not been added, some damping occurs. This is evident from the gradual attenuation of the amplitude of the oscillatory part of the graph of FIG. 18. For this reason, the maximum response of the pressure transducer without tabs at the resonant frequency is not unlimited, but is very high. In one particular instance, it was found that when tabs composed of silastic LS–53, having a thickness of 24 mils and extending ⅛ inch beyond the ends of the armature were employed, the resonant frequency, that is the frequency at which maximum response occurred, dropped from 3014 c.p.s. to 2790 c.p.s. and the ratio of the response at those resonant frequencies was reduced by a ratio of 44. The results obtained with such tabs and with other tabs are shown in Table I.

the form of strain gauge wires. An example of such an arrangement is shown in FIG. 21. The transducer there shown is similar to that previously shown in FIG. 11. In this case, however, the motion of the diaphragm 16 is communicated by means of relatively rigid elements 110, 111, 112 and 113 to a pair of parallel posts 116 and 117 causing the posts to move apart or together, depending upon whether the diaphragm is raised or lowered. In this case, two sets of wires $W_1$ and $W_2$ are wound about the two posts, being supported over the intervening space under tension. As the diaphragm is raised and lowered, these wires stretch and contract, thereby changing in resistance. The rigid elements 110, 111, 112 and 113 are actually made of elastic metal, such as spring steel, but they are arranged in a square configuration so that they are not subject to substantial bending, but instead transmit forces along their lengths to produce the required relative displacement of the posts 116 and 117.

Two auxiliary windings $W_3$ and $W_4$ supported on stationary posts 126 and 127 fixed to the case, are interconnected with the windings $W_1$ and $W_2$ in a D.C. bridge circuit as shown in FIG. 22. The output of this bridge circuit is amplified by means of an amplifier A' to produce an indication on a meter 32' which is proportional to the change in pressure producing the deflection of the diaphragm.

In this transducer, as in the transducer of FIG. 11, damping tabs are mounted on the outer side of the boss 44, but in addition, damping tabs 130 are cemented to the individual wires intermediate their ends. The tabs may be in the form of single strips cemented to the wires as shown in FIG. 23 or they may be in the form of pairs of strips pressed together on opposite sides of a piece of wire and cemented together to fix them securely in place, as shown in FIG. 24.

In this case, any spurious changes in the output of the meter 32' that would be caused by vibration of the wire transducing elements, are reduced by the damping tabs. Such damping tabs may also be mounted on the wires that provide the frictionless bearing of the transducer shown in FIGS. 13 and 14, thus minimizing vibration of these wires and attendant spurious effects on the movement of the armature 72.

While the invention has been described in connection with specific applications thereof, and in terms of the use of tabs composed of specific materials and having specific dimensions, it will be understood that the invention may be applied in many other ways. More particularly, though, the invention is best practiced by means of tabs which hold their shape under normal static conditions, the invention may also be applied where the damping means are in the form of filamentary or sheet-

*Table I*

| Tab Material | Tab thickness (in.) | Tab overhang (in.) | $f_0$ (No tabs) | $f_0$ (With tabs) | $Y_{max}$ (No tabs) | $Y_{max}$ (With tabs) | Ratio |
|---|---|---|---|---|---|---|---|
| Dow-Corning Silastic LS–53 | .024 | ⅛ | 3,014 | 2,790 | 77 | 1.75 | 44 |
| Dow-Corning Silastic RTV 502 | .035 | ¼ | 3,014 | 2,610 | 77 | 2.0 | 38 |
| Parker Compound 7587 | .039 | 1/16 | 3,014 | 2,630 | 77 | 2.3 | 33 |
| Connecticut Hard Rubber Co. Temp-R-Tape Type 6 | .003 | 1/16 | 3,014 | 2,960 | 77 | 3.2 | 24 |
| 3M No. 56 Plastic Mylar Tape | .002 | 3/16 | 3,014 | 2,912 | 77 | 3.5 | 22 |

An examination of Table I clearly shows that a high degree of damping can be obtained by employing tabs of many different materials and of widely different dimensions. In all of these cases, the tabs were sufficiently strong to hold their shape regardless of the orientation of the transducer relative to the vertical.

In the foregoing description of the invention, the tabs have been described as being supported directly on the sensing element. In some cases, however, it is desirable to mount damping tabs on the transducing elements. This is especially the case when the transducing elements are in like members. However, such damping elements are not as desirable as those of the self-sustaining type, as they are inclined to be somewhat erratic in their action and, in some cases, may even introduce vibratory noise.

It is therefore to be understood that the invention is not limited to the specific embodiments thereof that have been shown above, but that the invention may be applied to many other types of transducers and that changes may be made in the construction, dimensions and materials of which the various parts are composed, without departing from the scope of the invention.

The invention claimed is:

1. In a transducer having a sensing element of mass $M_1$ movable in response to a change in a physical phenomenon to be detected, and also having a transducing element responsive to the movement of said sensing element for producing an output signal indicative of the magnitude of said physical phenomenon, said transducer being subject to vibration liable to produce spurious signals in the output of said transducing element, the combination therewith of a damping tab of cantilever configuration secured to one of said elements, said damping tab having a mass $M_2$ and being composed of anelastic material, said masses $M_1$ and $M_2$ having relative magnitudes whereby the relationship $$1+\frac{2}{\left(\frac{M_2}{M_1}\right)}$$

is approximately 3.

2. In a transducer having a resilient sensing element of mass $M_1$ having a part that is movable in response to a change in a physical phenomenon to be detected, and also having a transducing element responsive to the movement of said part of said sensing element for producing a signal indicative of the magnitude of said physical phenomenon, said transducer being subject to vibration liable to produce spurious signals, the combination therewith of a damping tab having a mass $M_2$ of cantilever configuration secured to said sensing element, said damping tab being composed of anelastic material, said masses $M_1$ and $M_2$ having relative magnitudes whereby the relationship $$1+\frac{2}{\left(\frac{M_2}{M_1}\right)}$$

is approximately 3.

3. In a pressure transducer having a magnetic armature mounted at one end of a hollow twist tube, the other end of which is supported on a base member, said armature being rotatable about the axis of said twist tube in response to a change in the difference in pressure of fluid on opposite sides of the wall of said twist tube, said transducer also having magnetic means supported on said base for detecting movement of said armature in response to such a change in pressure, the improvement that comprises a pair of damping tabs attached to extremities of said armature and extending radially therefrom, said tabs otherwise being unattached, said tabs being composed of anelastic material, said tabs having much lower spring constants than said twist tube.

4. In a transducer as defined in claim 3 comprising a pair of rod-shaped masses secured to said tabs at points remote from the points at which said tabs are attached to said armature, said elongated masses extending in directions parallel to the axis of said twist tube.

5. In a transducer having a resilient sensing element supported on a base member and having a part remote from said base member rotatable about an axis in response to a change in the magnitude of a physical phenomenon such as temperature, pressure or speed, and also having means responsive to the rotation of said part about said axis for producing a signal indicative of a change in the magnitude of said physical phenomenon, the improvement therein of a vibration damper that comprises an elongated tab of anelastic material, said tab having a much lower spring constant than the material of which said sensing element is composed, said tab being secured at a point of said part remote from said axis and extending transversely of the direction of movement of said point, said tab being otherwise free of attachment.

6. In a transducer having a sensing member resiliently supported on a base by means of a resilient member and extending radially outwardly in opposite directions from an axis about which it rotates in response to a change in the magnitude of a physical phenomenon, said transducer also having means responsive to the rotation of said member about said axis for producing a signal indicative of a change in the magnitude of said physical phenomenon, the improvement that comprises a pair of tabs secured to points of said sensing member on opposite sides of said axis, said tabs extending radially relative to said axis, said tabs being composed of anelastic material, said tabs having spring constants, each of which is much less than the spring constant of said resilient member, said tabs being otherwise free of connection.

7. A transducer as defined in claim 6 comprising a mass secured to each of said tabs at a point remote from the point of attachment of the tab to said sensing member.

8. In a transducer that includes a resiliently mounted mass member to which forces are applied in accordance with a change in a physical phenomenon to be detected, and including means co-acting with said mass member for producing an output signal indicative of the magnitude of said physical phenomenon, the combination therewith of a damping tab of cantilever configuration secured to said mass member, said damping tab being composed of anelastic material, and an auxiliary mass member secured to said tab at a point thereof remote from said mass member.

9. In a transducer having a sensing member resiliently supported on a base member and movable relative to said base member in response to a change in the magnitude of a physical phenomenon such as temperature, pressure or speed, said transducer also having means responsive to the movement of said element for producing a signal indicative of a change in the magnitude of said physical phenomenon, the improvement therein of a vibration damper that comprises a solid body of anelastic material, said damper having a much lower spring constant than said sensing member, said damper being secured at one end thereof to said sensing member and being otherwise freely suspended, said sensing member being rotatable about an axis and said solid body of material comprising an elongated tab of such material provided with a mass secured to the tab at a point remote from the point of attachment of said tab to said sensing member.

References Cited in the file of this patent

UNITED STATES PATENTS

| | | |
|---|---|---|
| 1,855,570 | Edison | Apr. 26, 1932 |
| 2,031,948 | Harrison et al. | Feb. 25, 1936 |
| 2,100,833 | Bruckel et al. | Nov. 30, 1937 |
| 2,125,016 | Gruver | July 26, 1938 |
| 2,788,665 | Wiancko | Apr. 16, 1957 |
| 2,811,619 | Bourns et al. | Oct. 29, 1957 |
| 2,862,521 | Fenoglio | Dec. 2, 1958 |